(12) United States Patent
Heer et al.

(10) Patent No.: US 8,262,060 B2
(45) Date of Patent: Sep. 11, 2012

(54) ACTUATING DEVICE FOR AN ON/OFF VALVE

(75) Inventors: Klaus-Peter Heer, Herxheim (DE); Volker Hirsch, Steinfeld (DE)

(73) Assignee: Siemens AG, Munich (DE)

( * ) Notice: Subject to any disclaimer, the term of this patent is extended or adjusted under 35 U.S.C. 154(b) by 417 days.

(21) Appl. No.: 12/669,912
(22) PCT Filed: Jul. 15, 2008
(86) PCT No.: PCT/EP2008/059255
§ 371 (c)(1), (2), (4) Date: Jan. 20, 2010
(87) PCT Pub. No.: WO2009/013184
PCT Pub. Date: Jan. 29, 2009

(65) Prior Publication Data
US 2010/0282990 A1 Nov. 11, 2010

(30) Foreign Application Priority Data
Jul. 20, 2007 (DE) .......................... 10 2007 034 059

(51) Int. Cl.
*F16K 31/02* (2006.01)
(52) U.S. Cl. ...................... 251/129.04; 73/168; 700/282; 137/554
(58) Field of Classification Search ............. 251/129.04, 251/129.15; 137/554; 73/1.72, 168; 700/282, 700/292
See application file for complete search history.

(56) References Cited

U.S. PATENT DOCUMENTS

| | | | | |
|---|---|---|---|---|
| 6,089,269 A | * | 7/2000 | Essam ....................... 137/624.15 |
| 8,056,390 B2 | * | 11/2011 | Filkovski et al. ............... 73/1.72 |
| 8,074,512 B2 | * | 12/2011 | Al-Buaijan ..................... 73/168 |
| 2002/0108436 A1 | * | 8/2002 | Albuaijan ....................... 73/168 |
| 2005/0016254 A1 | | 1/2005 | Brown |
| 2006/0185418 A1 | | 8/2006 | Hoffmann |
| 2006/0191314 A1 | * | 8/2006 | Karte ............................. 73/1.72 |
| 2006/0266966 A1 | * | 11/2006 | Karte et al. ............. 251/129.04 |
| 2007/0018127 A1 | * | 1/2007 | Seberger .................. 251/129.04 |
| 2011/0160917 A1 | * | 6/2011 | Snowbarger .................. 700/282 |

FOREIGN PATENT DOCUMENTS

| | | |
|---|---|---|
| DE | 10 2005 004 477 | 8/2006 |
| DE | 10 2006 003750 | 8/2006 |
| EP | 1 500 857 | 1/2005 |

* cited by examiner

*Primary Examiner* — John K Fristoe, Jr.
*Assistant Examiner* — Ian Paquette
(74) *Attorney, Agent, or Firm* — Cozen O'Connot

(57) ABSTRACT

An actuating device for an on/off valve having a pneumatic drive that is connected to a compressed air supply by a solenoid valve, wherein when driven with a control voltage, the solenoid valve ventilates the pneumatic drive with the compressed air and, when the control voltage is not present, vents the pneumatic drive. The pneumatic drive moves the on/off valve into an operating position during ventilation and moves it into a safety position during venting. To permit the performance of partial-stroke tests in the simplest way possible, a device for performing the partial-stroke test includes a controllable switch which is closed in a quiescent state, and in this case supplies the control voltage to the solenoid valve. The controllable switch is opened by a control signal that is generated to perform the partial-stroke test. The control signal is supplied to the controllable switch by a position switch that is closed in the operating position of the on/off valve and is opened when the on/off valve reaches a predefined position in the direction of the safety position.

7 Claims, 1 Drawing Sheet

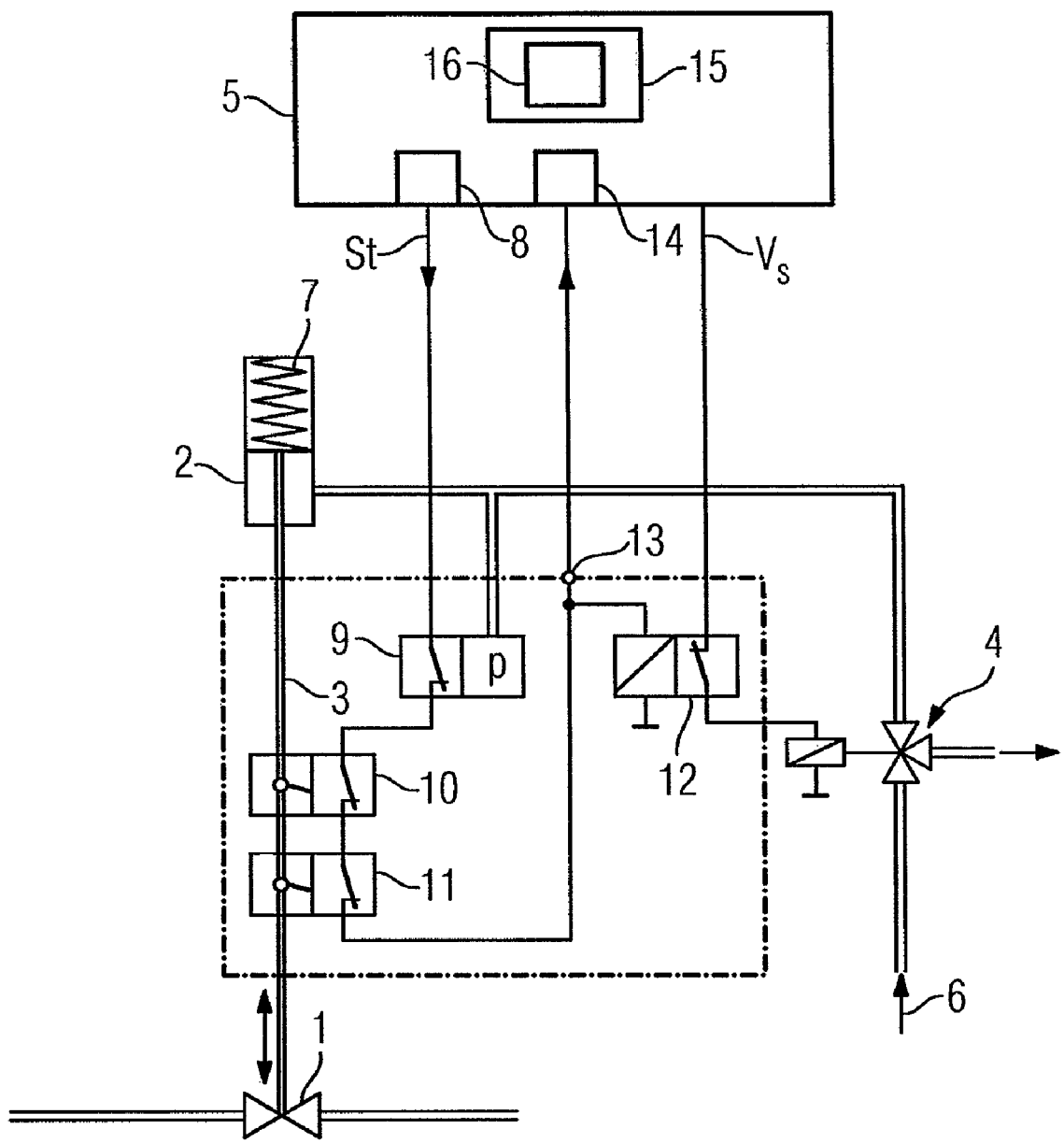

ACTUATING DEVICE FOR AN ON/OFF VALVE

CROSS-REFERENCE TO RELATED APPLICATIONS

This is a U.S. national stage of International Application No. PCT/EP2008/059255, filed on 15 Jul. 2008. Priority is claimed on German Application No. 10 2007 034 059.3, filed on 20 Jul. 2007.

BACKGROUND OF THE INVENTION

1. Field of the Invention

The invention relates to an actuating device for an on/off valve having a pneumatic drive which is connected to a compressed air supply by a solenoid valve, wherein the solenoid valve ventilates the pneumatic drive with the compressed air when driven with a control voltage and vents the pneumatic drive when the control voltage is not present, and the pneumatic drive moves the valve into an operating position during ventilation and moves the valve into a safety position during venting, and a means for performing a partial stroke test.

2. Description of the Related Art

In a known actuating device disclosed in DE 10 2006 003 750 A1 or DE 10 2005 004 477 A1, a pneumatic on/off valve, in particular an emergency shut-down (ESD) valve, is moved by a pneumatic drive either into an operating position, for example "on", or into a safety position, for example "off". A solenoid valve which is driven with a control voltage provided by a control system connects the pneumatic drive to a compressed air supply. In an emergency, the control voltage is switched off to vent the pneumatic drive with the solenoid valve. As a result, the valve is moved from the operating position into the safety position.

In order to allow the functionality of the actuating device to be checked as part of a partial stroke test, an additional position regulator is fitted to the pneumatic drive. During the partial stroke test, the valve is moved by the position regulator from the operating position over a portion of its actuating travel, and is then moved back again. In this case, the change in position is so small that there is no need to interrupt ongoing operation of the installation in which the actuating valve is installed, and its operation is disrupted only to an insignificant extent. During the partial stroke test, the actuating movement is recorded and stored. In order to drive the position regulator, an analog output subassembly must be provided in the control system, which subassembly provides a 4-20 mA signal, for example, in order to transmit the desired value for the valve controller. If the test is not evaluated in the position regulator itself, an analog input subassembly, to which the position regulator transmits the position data recorded by it, must also be provided in the control system.

Providing a position regulator only for the partial stroke test involves a large amount of material and financial expenditure. In addition, although the fitting comprising the valve and pneumatic drive can be tested using the position regulator and the partial stroke test carried out by the latter, the solenoid valve cannot be tested in this manner and requires a further test method.

SUMMARY OF THE INVENTION

It is therefore an object of the invention to provide a way to perform partial stroke tests on pneumatically driven on/off valves using means which are as simple as possible.

This and other objects and advantages are achieved in accordance with the invention by providing an actuating device with means for performing the partial stroke test that includes a controllable switch which is closed in the quiescent state, supplies the control voltage to a solenoid valve and is opened by a control signal generated to perform the partial stroke test. In addition, the control signal is supplied to the controllable switch by a position switch which is closed in the operating position of the valve and is opened when the valve reaches a predefined position in the direction of the safety position.

In response to the control signal which is generated, for example, by a control system, the controllable switch interrupts the voltage supply for the solenoid valve. As a result, the solenoid valve is deactivated and the pneumatic drive is consequently vented. The valve then moves from the operating position to the predefined position, where the position switch opens and interrupts the path of the control signal to the controllable switch when the predefined position is reached. Therefore, the controllable switch again shuts down the voltage supply for the solenoid valve which, activated thereby, restores the pneumatic connection between the position regulator and the compressed air supply. As a result the movement of the valve is stopped and reversed. The predefined position at which the position switch opens is selected such that ongoing operation of the installation in which the valve is installed is disrupted only to an insignificant extent by the valve movement during the test. In addition to the very simple and cost-effective implementation of the means for performing the partial stroke test, another advantage of the actuating device in accordance with the invention is that the partial stroke test is used not only to test the function of the fitting comprising the valve and pneumatic drive but also to test the solenoid valve.

In order to evaluate the test, the current resulting from the control signal (voltage signal) can be measured, for example, where the current is interrupted whenever the valve reaches the predefined position at which the position switch opens. Alternatively, the control signal between the position switch and the controllable switch can be routed to a signaling output.

It is desirable for the partial stroke test to be able to be initiated, monitored and evaluated automatically by a control system. However, since most on/off valves have to react very quickly to be able to stop a fluid flow in an emergency, the computation cycle times of control systems are generally too long to directly control and evaluate the progress of a partial stroke test.

Another advantage of the actuating device the invention is that the test can be performed independently of the respective computation cycle time of the control system, on the one hand, and independently of the reaction speed of the actuator, on the other hand. The duration of the control signal generated by the control system is not critical because the movement of the valve is stopped and reversed anyway when it reaches the predefined position. Here, the control signal is preferably generated for such a long time that the valve repeatedly oscillates about the predefined position. This occurs because the valve is moved back again after the predefined position has been reached, with the result that the position switch closes again; the control signal which is present is then switched through to the controllable switch again, with the result that the latter opens, the solenoid valve is deactivated and the valve is moved to the predefined position again. This operation is repeated as long as the control signal is generated, with the result that the valve oscillates about the predefined position. The respective computation cycle time of the control system is not critical for the evaluation of the test, i.e., the abovementioned evaluation of the current resulting from the control signal or the evaluation of the control signal routed to the signaling output, because the control signal must be generated only for a sufficient length of time.

The technical state of the actuating device can be inferred from the oscillating movement (frequency) of the valve during the test. For this purpose, the mark-to-space ratio of the control signal supplied to the controllable switch downstream of the position switch or the mark-to-space ratio of the resultant current can be recorded and evaluated in a particularly simple manner. For example, the mark-to-space ratio recorded for a new actuating device can be stored in the control system and can be used as a reference pattern for mark-to-space ratios recorded during subsequent tests, where the deviations from the reference pattern signal changes in the technical state of the actuating device and, if appropriate, a need for maintenance.

In order to ensure that, for example, a defect in the position switch does not result in uncontrollably large changes in the position of the valve, a further position switch may be arranged in series with the position switch, which further position switch is closed in the operating position of the valve and is opened when the valve reaches a further predefined position beyond the predefined position in the direction of the safety position. Alternatively or in addition, a pressure switch may be arranged in series with the position switch, which pressure switch monitors the pressure in the pneumatic drive and opens when a minimum pressure is undershot and thus terminates the partial stroke test.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to explain the invention further, reference is made below to the single drawing which shows an exemplary embodiment of the actuating device according to the invention.

DETAILED DESCRIPTION OF THE PREFERRED EMBODIMENTS

The actuating device illustrated in the figure has an on/off valve 1 which can be moved either into an operating position, for example "on", or into a safety position, for example "off", using a pneumatic drive 2 via an actuating element 3, here in the form of a lifting rod. A solenoid valve 4 which is driven with a control voltage $V_S$ provided by a control system 5 connects the pneumatic drive 2 to a compressed air supply 6. In an emergency, the control voltage $V_S$ is switched off to vent the pneumatic drive 2 through the solenoid valve 4. The pneumatic drive 2 then becomes unpressurized and moves the actuating element 3 with the valve 1, for example, under the action of a spring 7, from the operating position into the safety position.

In order to be able to check the functionality of the actuating device as part of a partial stroke test, the control system 5 generates a control signal St at predefined times at a binary output 8, which control signal is routed to a controllable switch 12 by a pressure switch 9, a position switch 10 and a further position switch 11 which are all connected in series. The controllable switch 12, here a relay, is closed when not being driven and in this case connects the solenoid valve 4 to the control voltage $V_S$. When driven by the control signal St, the controllable switch 12 is opened and interrupts the voltage supply for the solenoid valve 4. The latter then vents the pneumatic drive 2, with the result that the actuating element 3 is moved with the valve 1 from the operating position in the direction of the safety position. Following a movement which is so short that ongoing operation of the installation in which the valve 1 is installed is disrupted only to an insignificant extent, the valve 1 reaches a predefined position at which the position switch 10 is opened and interrupts the path of the control signal St to the controllable switch 12. The controllable switch 12 therefore again shuts down the voltage supply for the solenoid valve 4 which, activated thereby, restores the pneumatic connection between the compressed air supply 6 and the pneumatic drive 2, with the result that the movement of the valve 1 is stopped and reversed. This results in the position switch 10 closing again and the control signal St which is present being switched through to the controllable switch 12 again, with the result that the latter opens again, the solenoid valve 4 is deactivated and the valve 1 is moved to the predefined position again. This operation is repeated as long as the control system 5 generates the control signal St, with the result that the valve 1 oscillates about the predefined position.

While the valve 1 is oscillating about the predefined position, the control signal St in the region between the pressure and position switches 9, 10, 11 and the controllable switch 12 is supplied to a binary input 14 of the control system 5 by a signaling output 13, which system evaluates the mark-to-space ratio of the recorded signal in an evaluation device 15.

Alternatively, the current belonging to the control signal St can be evaluated at the binary output 8. In the new state of the actuating device, the recorded mark-to-space ratio can be stored as a reference in a memory 16 of the control system 5. During subsequent operation of the actuating device, the mark-to-space ratio then recorded in a partial stroke test is compared with the reference in order to detect changes in the technical state of the actuating device.

In order to ensure that, for example, a defect in the position switch does not result in uncontrollably large changes in the position of the valve 1, the further position switch 11 is arranged in series with the position switch 10, which further position switch opens when the valve 1 reaches a further predefined position beyond the position predefined by the position switch 10. Furthermore, the pressure switch 9 which is likewise in series with the position switch 10 monitors the pressure in the pneumatic drive 2 and opens when a minimum pressure is undershot to terminate the partial stroke test.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An actuating device for an on/off valve, comprising:
a solenoid valve having a connection for a compressed air supply;
a pneumatic drive connected to the solenoid valve, the solenoid valve is operable in a first operating state configured for ventilating the pneumatic drive with the compressed air supply when driven with a control voltage and is operable in a second state configured for venting the pneumatic drive when the control voltage is not present, and the pneumatic drive moving the on/off valve into an operating position during the ventilating and moving the on/off valve into a safety position during the venting; and
means for performing a partial stroke test including:
a controllable switch that is closeable in a quiescent state and supplies the control voltage to the solenoid valve, the controllable switch being openable by a control signal generated to perform the partial stroke test; and
a position switch configured to supply the control signal to the controllable switch, the position switch being closed in the operating position of the valve and being opened when the valve reaches a predefined position in the direction of the safety position.

2. The actuating device as claimed in claim 1, further comprising:
a further position switch connected in series with the position switch;
wherein the further position switch is closed in the operating position of the on/off valve and is opened when the valve reaches a further predefined position beyond the predefined position in the direction of the safety position.

3. The actuating device as claimed in claim 1, further comprising:
a pressure switch connected in series with the position switch;
wherein the pressure switch monitors pressure in the pneumatic drive and is opened when a minimum pressure is undershot.

4. The actuating device as claimed in claim 1, further comprising a control system generating the control signal, wherein the control signal is generated for a period of time so that the on/off valve repeatedly oscillates about the predefined position.

5. The actuating device as claimed in claim 4, wherein the control signal at a position between the position switch and the controllable switch is routed to a signaling output.

6. The actuating device as claimed in claim 1, further comprising a control system generating the control signal, wherein the control signal at a position between the position switch and the controllable switch is routed to a signaling output at the control system.

7. The actuating device as claimed in claim 6, the control system further comprising an evaluation device, which is connected to the signaling output, for evaluating the mark-to-space ratio of the supplied control signal.

* * * * *